United States Patent [19]

Herrick et al.

[11] Patent Number: 5,190,653
[45] Date of Patent: Mar. 2, 1993

[54] COFFEE BREWER FILTRATION DEVICE

[75] Inventors: James P. Herrick, Brookfield, Conn.; Robert F. Smith, Ridgefield Park, N.J.; Mete Bruncaj, Yonkers, N.Y.

[73] Assignee: Kraft General Foods, Inc., Northfield, Ill.

[21] Appl. No.: 606,040

[22] Filed: Oct. 30, 1990

[51] Int. Cl.⁵ .......................................... B01D 29/085
[52] U.S. Cl. ................... 210/477; 210/282; 210/494.2; 210/498; 210/499; 426/77
[58] Field of Search ............... 210/477, 482, 488, 489, 210/490, 494.1, 494.2, 495, 498, 499; 426/77

[56] References Cited

U.S. PATENT DOCUMENTS

| | | | |
|---|---|---|---|
| 3,935,112 | 1/1976 | Greutert | 210/482 |
| 4,080,299 | 3/1978 | Bartolome | 210/482 |
| 4,123,228 | 10/1978 | Frei et al. | 210/482 |
| 4,231,876 | 11/1980 | Zimmermann et al. | 210/482 |
| 4,801,379 | 1/1989 | Ehrsan et al. | 210/498 |
| 4,867,880 | 9/1989 | Pelle et al. | 210/477 |

FOREIGN PATENT DOCUMENTS 626610 12/1962 France .

Primary Examiner—Robert A. Dawson
Assistant Examiner—W. L. Millard
Attorney, Agent, or Firm—Thomas R. Savoie

[57] ABSTRACT

A reusable filtration element for a coffee brewer has a microscopic arrangement of holes which permit coffee beverage to pass through while turbidity and sediment causing solids are effectively removed. The holes are preferably from 12 to 60 microns across and provide from 5 to 30 % open area in the filter element. In one preferred embodiment, the holes are circular, arranged in rows such that intersecting rows form an angle of 60°, and preferably taper from top to bottom. A preferred filtration element is preferably formed by photoetching stainless steel foil. The filtration element is preferably positioned over a foraminous support.

20 Claims, 2 Drawing Sheets

COFFEE BREWER FILTRATION DEVICE

TECHNICAL FIELD

The invention relates to coffee brewers, and particularly to filtration devices for use in combination with the coffee brewing chambers of automatic coffee makers.

Coffee brewers, especially automatic ones, are relied upon to provide brewed coffee of high quality in short periods of time.

The coffee should have a good balance of flavor, appearance and aroma. Roast and ground coffee contains significant amounts of fines which cause turbidity and sediment if not removed. Typically, these fines are removed by filtration using a paper filter. However, where automatic operation of the brewing apparatus is required, filter paper is difficult to work with.

In some automatic coffee makers, paper filters have been replaced with reusable filtration members constructed of other materials. However, reusable filtration members present design problems. It is difficult to achieve good filtration rates while at the same time removing insoluble solids.

DISCLOSURE OF INVENTION

It is an object of the invention to provide a coffee brewer filtration device which permits rapid filtration while effectively filtering fine coffee insolubles.

It is another object of the invention to provide a coffee brewer filtration element having a design which minimizes sediment at any of a number of brewing conditions.

It is a still further object of the invention to enable filtration of coffee from a brewing chamber which provides a coffee beverage of good flavor and aroma and has improved appearance due to a low ratio of insoluble solids to soluble solids.

It is another object of the invention to provide a coffee brewer filtration device which is reusable and is easily cleaned.

It is another object of one aspect of the invention to provide a coffee brewer filtration device which provides effective fines separation without becoming clogged.

It is a more specific object of one aspect of the invention to provide a coffee brewer filtration device which permits rapid filtration while effectively removing fine particles from the brewed beverage, yet is not easily clogged and is easy to clean.

These and other objects are achieved by the invention which provides a reusable filtration device adapted for use in a coffee brewer, and in one embodiment comprises: a filter element having a first surface intended for contact with an aqueous coffee brewing mixture containing suspended (i.e., fine) coffee particulates, a second surface on the side opposite the first surface, and holes extending through the filter element from the first surface to the second wherein the individual holes have an open area of from 100 to 4,000 square microns and together provide an open area of from 5 to 30%.

The hole diameters, distance between hole centers, thickness of the filter element and the ratios of each of these to the others form preferred embodiments of the invention.

The filter element can be a metal foil which has the holes formed therein by photoetching, laser or other means. It can also be a wire mesh having the desired hole size or on which a metal has been plated to adjust the hole sizes to the desired range.

In another of its aspects, the invention provides a filtration device which comprises: a filter element as described above and a foraminous support member of sufficient strength and configuration to support the filter element under moderately elevated filtration pressures.

BRIEF DESCRIPTION OF THE DRAWINGS

The present invention will be better understood and its advantages more apparent in view of the following detailed description, especially when read with reference to the accompanying drawings, wherein.

BEST MODE FOR CARRYING OUT THE INVENTION

Figure 1:
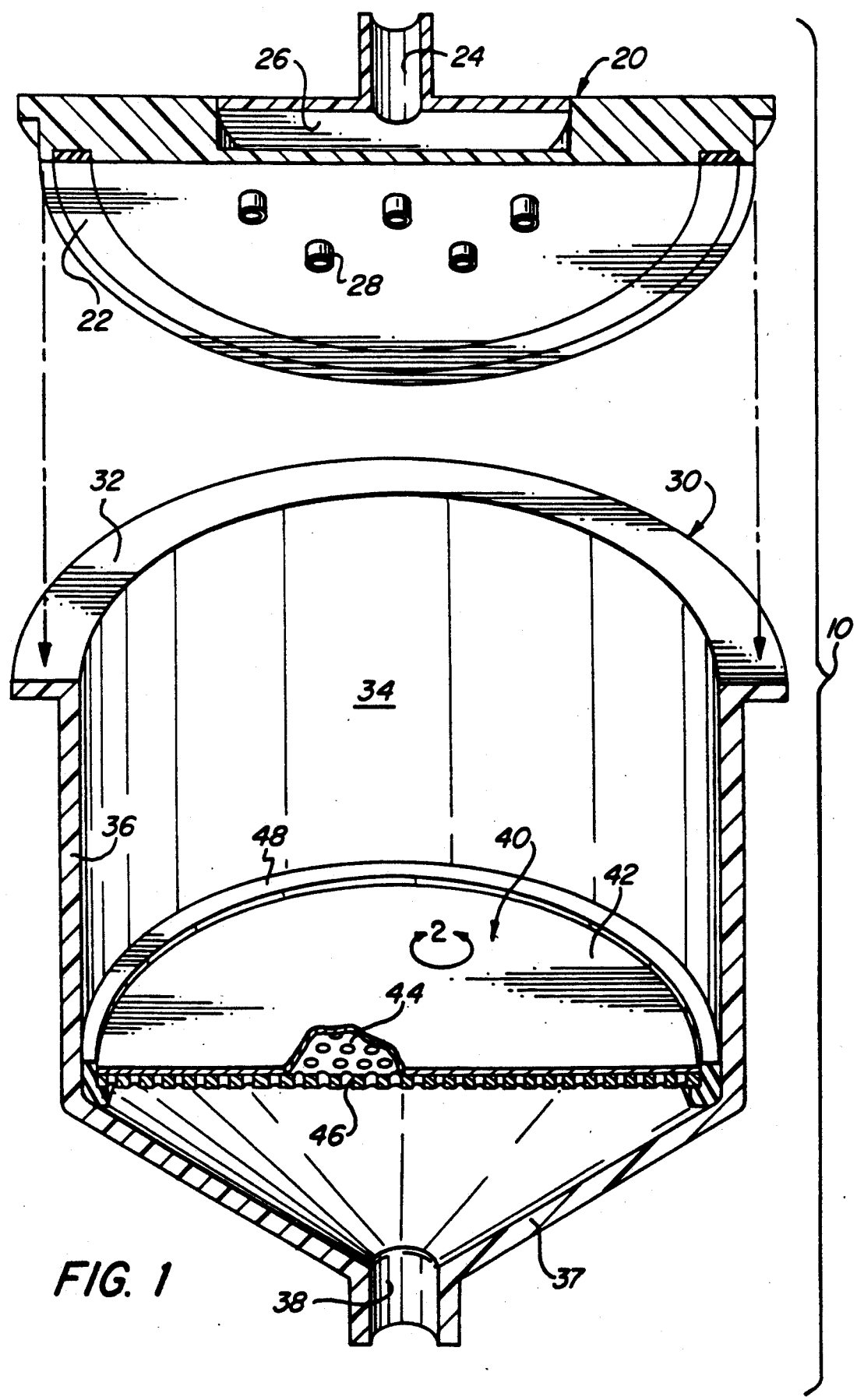
FIG. 1 is a cut away perspective view showing a brewing chamber with a reusable filtration device.

The reusable filtration device of the invention will be described in conjunction with the drawing to show its advantages with regard to preferred materials, structural parameters and method of use. In this regard, attention is drawn to FIG. 1 which shows a perspective view, partially in section, of a coffee brewing apparatus shown generally as 10, having a cover assembly 20, a base member 30, and a filter assembly 40, including a filter element 42 according to the invention.

The invention is not restricted to use in this environment, but can be employed in any suitable beverage maker, including both atmospheric and pressure brewing for institutional, home and vending use for quantities as low as single serving portions. The unique ability of the invention to permit rapid filtration while controlling the amount of suspended solids well serves the requirements in all of these environments. The improvements of the invention can be applied to brewing quantities for single cup (e.g., 150 to 200 ml), pot (e.g., 2 to 12 cups) and urn (e.g. 10 to 150 cups).

FIG. 1 shows the cover assembly 20 tipped back from the base member 30. In brewing position, seal 22 contacts sealing flange 32 with sufficient force to provide a seal under moderately elevated brewing pressures, e.g. on the order of from 0.1 to 4 bar. The structural material for the cover assembly 20 and the base member 30 is shown as plastic and can be any heat-stable plastic, including thermosetting resins such as phenol formaldehyde, epoxy, polycarbonate, and preferably, polysulfone.

When the base member is open, roasted and ground coffee is deposited within a brewing chamber 34 defined by the side wall 36 of the brewing chamber, the filter element 42 and the lower surfaces of the cover assembly 20. The grind size may vary among those commercially available. Preferred grinds will have average particles within the range of 300 to 850 microns, most typically in the range of from 400 to 800 microns.

To brew the coffee, the seal 22 is brought into sealing engagement with flange 32 and hot water is supplied to the brewing chamber under a moderate superatmospheric pressure (e.g. up to 4 bar, typically 0.1 to 2.0 bar) through feed line 24 to header 26 and distribution jets 28.

During brewing, moderate pressure within the brewing chamber 34 forces brewed beverage out of the chamber, through filter element 42, and the entire filter assembly 40 to a collection chamber below which is defined by bottom wall 37 which is pitched toward outlet 38 which delivers the beverage to a suitable collection vessel (such as a coffee pot, not shown). Filtration rates of from 0.08 to 1.0 milliliters of coffee beverage per square centimeter of filter element surface area are achievable per second while maintaining sediment at less than 0.05, and preferably less than 0.04, grams per 500 ml of beverage. Preferred filtration rates are from 0.1 to 0.25 milliliters per square centimeter per second and preferred sediment levels are below 0.025 grams per 500 milliliters.

The filter assembly 40, in addition to filter element 42, includes foraminous support sheet 44, and annular Seal 48. Foraminous support sheet 44, preferably of stainless steel offers strength to support filter element 42. It should contain the maximum open area consistent with strength. For example, an at least 0.25 millimeters thick sheet can have holes 46 (preferably circular) covering from 8 to 80 percent of its surface. The openings in these holes are typically from 1 to 2.5 millimeters in diameter and spaced from 1.25 to 5 millimeters apart from center to center. As will be seen, this is far different from the filter element. Foraminous element 44 is of sufficient strength to provide support for the thinner filter element 42 under moderately elevated filtering pressures.

Figure 2:
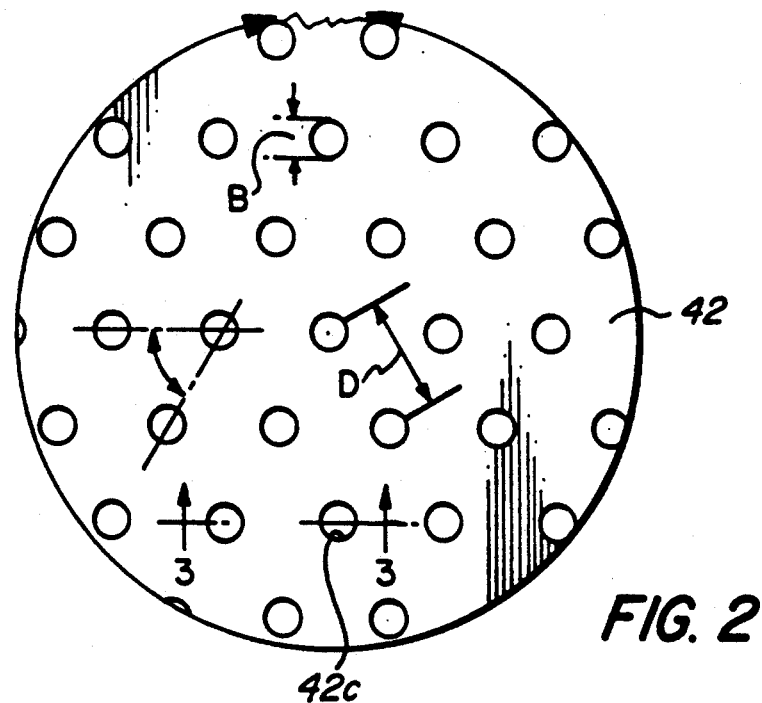
FIG. 2 is an enlarged top plan view showing the detail of the microscopic hole pattern and spacing for a preferred embodiment employing a metal foil filter element, from an area as indicated in FIG. 1.
Figure 3:
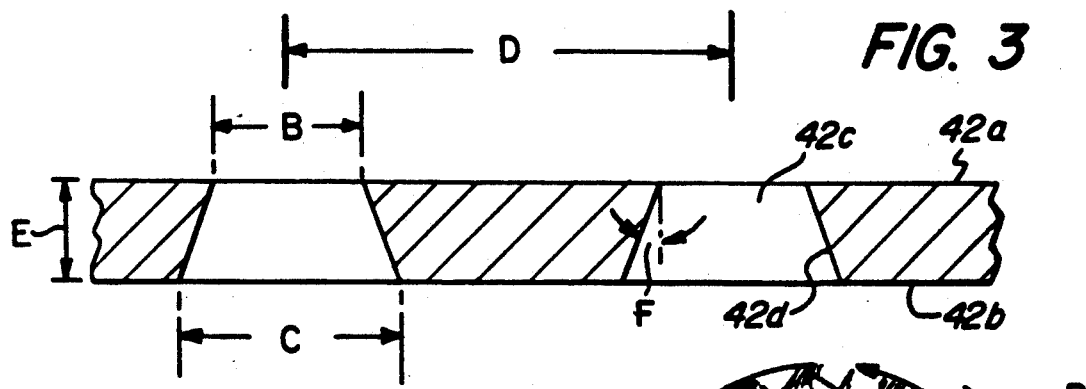
FIG. 3 is an enlarged sectional view showing the detail of a preferred filter element taken along line 3—3 in FIG. 2.
Figure 4:
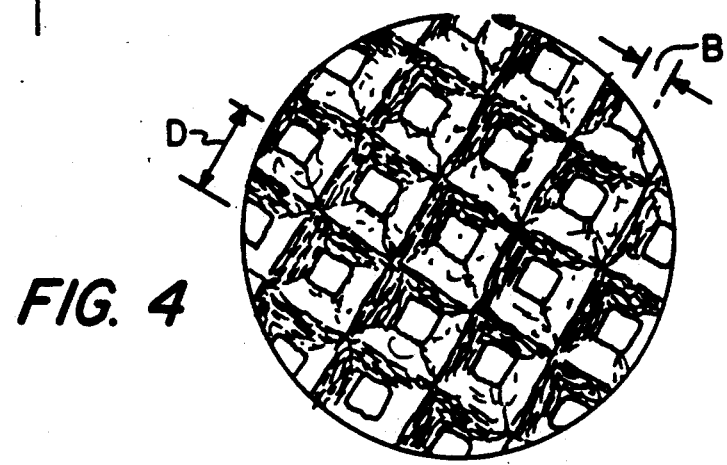
FIG. 4 is an enlarged top plan view of a metal grid filter element of the invention.

The invention in its broader aspects employs filter elements formed of metal foil, wire mesh and electroformed grids. Each performs well when the inventive features described herein are employed. FIGS. 2 and 3 show the detail of one form of filter element 42 as illustrative of the dimensions and configurations which apply to the various embodiments. FIG. 2 is a top plan view of a portion of the surface area circumscribed by line 2 as in FIG. 1. FIG. 3 is a cross-sectional view taken along line 3—3 in FIG. 2. FIG. 4 shows an enlarged section for the embodiment employing an electroformed grid as the filter element.

In the embodiment illustrated in FIGS. 2 and 3, the filter element 42 comprises a metal foil having a first surface 42a which here is shown as the top surface and is intended for contact with an aqueous coffee brewing mixture. The second surface 42b is on the side opposite the first surface and is shown here as the bottom surface. Holes 42c extend through the screen from the first surface to the second. The holes 42c are arranged in rows such that any two intersecting rows intersect at an angle of from 45° to 90°, preferably 60° as shown in FIG. 2 as angle A.

The holes themselves are microscopic and, looking at the screen placed against a dark background gives the appearance of a solid metal foil. When placed over a light source, however, light will be transmitted through the holes which when viewed from the top (first surface) will have an open space of from 5 to 30%, preferably in the range of from 7 to 23%.

Holes 42c are shown as circular in the drawing, but they could be of any shape including polygonal, star or the like. The holes are, however, typically circular or rounded. The size of the suspended particulates which can be separated from the brewed coffee will depend upon the minor dimensions of the holes (i.e., the shortest line which can be drawn edge-to-edge through the center of the hole).

The holes 42c will have openings of sufficient size to permit rapid filtration without permitting passage of excessive particulates which cause turbidity and sediment. The holes typically have an open area at the top surface of from 100 to 4,000 square microns and preferably from 400 to 3,000 square microns in the embodiment where a metal foil is employed. Diameters or other minor dimension (dimension B in FIGS. 2 through 4) of from 12 to 60 microns are preferred at the top surface, e.g. from 25 to 50 microns, and up to about 80 microns at the bottom (dimension C), e.g. from 25 to 60 microns. The filter element will desirably have from 30 to 1,000 holes per square millimeter, typically from 40 to 200 in this embodiment.

The holes will be separated sufficiently to provide rapid filtration rates. The center-to-center separation of the holes (dimension D in FIGS. 2 through 4) can effectively be in the range of from 10 to 150 microns, preferably 40 to 140 microns in this embodiment. Viewed from the first surface, the ratio of the hole diameter to hole spacing is desirably in the range of from less than 1:5, e.g. 1:4 to 1:2.

The holes 42c are preferably tapered from the first surface toward the second surface. The angle of taper (F) is preferably up to 30° from the vertical (i.e., a line parallel to the axis of the hole) and is typically at least 10°. This taper or flare is advantageous in this microscopic screen to best prevent capture and buildup of solids in the element. The holes preferably provide a sharp corner at the juncture of the top surface and the inside wall 42d of the hole.

The filter element can be made of any material and by any process effective for the purpose. Preferred materials include metal foils safe for food use, preferably stainless steel. Foil thicknesses of at least 0.5 mils will be satisfactory and there is no practical need to employ films over 4 mils. Thicknesses of from 1 to 2 mils are preferred. The holes may be produced by laser, photoetching or other suitable method. Formation by photoetching is preferred because after photographically applying an acid resistant layer in the desired pattern, the use of acid spray to remove the metal from the holes not only provides holes of precise pattern and size, but can be controlled to result in the desired hole taper.

FIG. 4 shows the detail of an electroformed metal grid as a filter element according to the invention. In this embodiment, the holes will typically be arranged in rows at 90° angles and will be square as shown due to the nature of the process for forming them wherein a metal is deposited on a wire mesh by electroforming or the like. The holes will desirably provide an open area of from 5 to 30%. Typically, from 100 to 275 holes will be present per square millimeter. The size of the openings will typically be in the range of from 200 to 4,000, preferably 200 to 2,000, square microns having minimum dimensions across individual holes of from 15 to 40 microns and distances between openings of from 20 to 120 microns.

The invention also contemplates the use of wire mesh filter elements. These are not specifically illustrated because their appearance is so well known. In this embodiment, the holes are typically arranged in rows at 90° angles and will be square with a complete interweaving or warp and weft wire strands. The holes will desirably provide an open area of from 5 to 30%. Typically, from 250 to 1,000 holes will be present per square millimeter. The size of the openings will typically be in the range of from 200 to 4,000 square microns, having minimum dimensions across individual holes of from 15 to 60 microns, and distances between openings of from 20 to 50 microns. Preferred meshes are 500×500 and 635×635 sizes.

The following Example is provided to further illustrate and explain a preferred form of the invention and is not to be taken as limiting in any regard. Unless otherwise indicated, all parts and percentages are by weight.

EXAMPLE

Several pots of coffee were prepared employing several filter elements of this invention.

Filter element 1 was a 1 mil stainless steel foil, photo-etched to provide rows of holes in an intersecting 60° pattern, i.e., the centers of three closely spaced holes defined an equilateral triangle and intersecting rows formed angles of 60°. The holes were circular and had a top diameter of approximately 40 microns (with a range of from 31 to 42 microns) and a bottom diameter of approximately 60 microns, and were spaced 135 microns center-to-center.

There were approximately 66 holes per square millimeter, and the element showed an open area of about 8.3%.

Filter element 2 employed an electroformed metal grid having square holes an average of 30 microns across and 60 microns apart, arranged in rows in a 90° pattern. There were approximately 150 holes per square milimeter and the element showed an approximately 13% of open area.

Filter element 3 employed a 500 by 500 wire stainless steel mesh.

These filter elements were supported in a coffee brewing device having a brewing chamber of the type shown in FIG. 1. The indicated amount of roasted and ground coffee was placed on top of the filter element, the chamber was sealed and 1,800 ml of water at the indicated temperature was supplied to the chamber at a pressure of 0.8 bar. The brewed and filtered coffee, judged of high quality and low sediment, was then analyzed according to several tests with the following results:

|  | 1 | 2 | 3 |
|---|---|---|---|
| Grind (microns) average diameter | 600 | 600 | 600 |
| Weight (g) | 1.7 | 1.8 | 1.7 |
| Water Temperature (°F.) | 182 | 185 | 182 |
| Coffee Beverage (g) | 1594 | 1580 | 1580 |
| Transmittance (%)[1] | 50 | 47 | 45.5 |
| Yield, Density[2] | 25 | — | 25.3 |
| Yield, Hydrometer[3] | 23.6 | — | 23.7 |
| Sediment (g/500 ml) | 0.019 | 0.032 | 0.024 |

[1]Bausch & Lomb Spectronic 20, using light at a wavelength of 640 nanometers and a Pyrex spectro photometer cuvette (#9800).
[2]Yield is the percentage of coffee solids added which are recovered in solution. This density-based yield determines solids by an Anton Parr Calculating Digital Density Meter - Model DMA-46. A 2 cc sample is measured at 25° C. and the value read when stabilized.
[3]This hydrometer based yield determines yield by a Rascher & Betzold Hot Coffee Hydrometer and cylinder, at 142° F. and 138° F.

The results compare favorably to coffee prepared in an atmospheric brewer using a paper filter.

The above description is for the purpose of enabling the person skilled in the art to make and use the invention and is not intended to describe each and every modification and variation of it which will be obvious to the skilled worker upon reading. All such modifications and variations are intended, however, to be included within the scope of the invention which is defined by the following claims.

We claim:

1. A reusable filtration device adapted for use in a coffee brewer, comprising:
   a filter element having a first surface intended for contact with an aqueous coffee brewing mixture containing suspended coffee particulates, a second surface on the side of the filter element opposite the first surface, and holes extending through the filter element from the first surface to the second, wherein individual holes have an open area in the first surface of from 100 to 3,000 square microns and together provide an open area of from 5 to 30%, and the center-to-center spacing of the holes is within the range of from 10 to 150 microns.

2. A filtration device according to claim 1 wherein: the filter element is stainless steel.

3. A filtration device according to claim 1 wherein the holes are arranged in rows such that any two intersecting rows intersect at an angle of from 45° to 90°.

4. A filtration device according to claim 1 which further includes a foraminous support member effective to support the filter element under moderately elevated filtering pressures.

5. A filtration device according to claim 1 wherein the filter element comprises a metal foil.

6. A filtration device according to claim 1 wherein the filter element comprises an electroformed metal grid.

7. A filtration device according to claim 1 wherein the filter element comprises a wire mesh.

8. A filtration device according to claim 1 which is capable of filtering coffee beverage from a brew suspension at a rate of from 0.08 to 1 milliliters of beverage per square centimeter of filter surface area per second and reducing the level of suspended particulates to less than 0.05 grams per 500 milliliters.

9. A reusable filtration device adapted for use in a coffee brewer, comprising:
   a metal foil having a first surface intended for contact with an aqueous coffee brewing mixture containing suspended coffee particulates, a second surface on the side of the foil opposite the first surface, and holes extending through the foil from the first surface to the second, wherein individual holes have an open area in the first surface of from 400 to 3,000 square microns and the individual holes are arranged in rows such that any two intersecting rows intersect at an angle of from 45° to 90°, and the center-to-center spacing of the holes is within the range of from 40 to 150 microns.

10. A filtration device according to claim 9 wherein the foil is stainless steel.

11. A filtration device according to claim 9 wherein there are from 40 to 200 holes per square millimeter.

12. A filtration device according to claim 9 wherein the holes are circular and have diameters on the first surface within the range of from 12 to 60 microns.

13. A filtration device according to claim 9 wherein the foil is from 0.5 to 4.0 mils thick, and the filtration device further includes a foraminous support member.

14. A filtration device according to claim 9 having an open space through the first surface of from 5 to 30%, and taper toward the second surface at an angle of from 10° to 30°.

15. A filtration device according to claim 9 which is capable of filtering coffee beverage from a brew suspension at a rate of from 0.1 to 1 milliliters of beverage per square centimeter of filter surface area per second and reducing the level of suspended particulates to less than 0.05 grams per 500 milliliters.

16. A reusable filtration device adapted for use in a coffee brewer, comprising:
a metal foil having a first surface intended for contact with an aqueous coffee brewing mixture containing suspended coffee particulates, a second surface on the side of the foil opposite the first surface, and holes extending through the foil from the first surface to the second, wherein individual holes have an open area in the first surface of form 100 to 3,000 square microns and the individual holes are arranged in rows such that any two intersecting rows intersect at an angle of 60°.

17. A reusable filtration device adapted for use in a coffee brewer, comprising:
a metal grid having a first surface intended for contact with an aqueous coffee brewing mixture containing suspended coffee particulates, a second surface on the side of the grid opposite the first surface, and holes extending through the grid from the first surface to the second, the holes being arranged in rows such that any two intersecting rows intersect at an angle of 90° and provide a total open space through the grid of from 5 to 30%, and wherein the metal grid is prepared by electroforming a coating on a wire mesh with square holes to reduce the size of the individual holes effectively to provide open areas of from 200 to 2,000 square microns, spacing between the individual holes of from 20 to 120 microns, and dimensions across the individual holes of from 15 to 40 microns.

18. A filtration device according to claim 17 wherein there are from 100 to 275 holes per square milimeter.

19. A reusable filtration device adapted for use in a coffee brewer, comprising:
a wire mesh having a first surface intended for contact with an aqueous coffee brewing mixture containing suspended coffee particulates, a second surface on the side of the mesh opposite the first surface, and holes extending through the mesh from the first surface to the second, the holes being arranged in rows such that any two intersecting rows intersect at an angle of 90°, wherein individual holes have an open area in the first surface of from 200 to 4,000 square microns and provide a total open space through the mesh of from 5 to 30%, and wherein the center-to-center spacing of the holes is within the range of from 10 to 150 microns.

20. A filtration device according to claim 19 wherein the mesh has square holes, and there are from 30 to 650 holes per square millimeter.

* * * * *